United States Patent [19]

Snyder

[11] 4,355,658

[45] Oct. 26, 1982

[54] PILOT VALVE WITH INDICATING LOCKOUT KNOB

[75] Inventor: David E. Snyder, Longview, Tex.

[73] Assignee: U.S. Industries, Inc., New York, N.Y.

[21] Appl. No.: 216,811

[22] Filed: Dec. 15, 1980

[51] Int. Cl.³ .............................................. F16K 37/00
[52] U.S. Cl. .................................. 137/557; 137/553; 137/625.66
[58] Field of Search .................... 137/553, 557, 625.66, 137/624.27, 458

[56] References Cited

U.S. PATENT DOCUMENTS

| | | | |
|---|---|---|---|
| 3,511,276 | 5/1970 | Jedden et al. | 137/624.27 |
| 3,823,739 | 7/1974 | McMullen | 137/625.66 |
| 3,878,862 | 4/1975 | Blanton | 137/553 |
| 3,943,974 | 3/1976 | Connelly et al. | 137/625.66 |
| 4,017,053 | 4/1977 | Wells et al. | 137/458 |
| 4,121,615 | 10/1978 | Bergeron | 137/625.66 |
| 4,207,924 | 6/1980 | Peters | 137/625.66 |
| 4,239,058 | 12/1980 | Peters | 137/625.66 |
| 4,256,141 | 5/1981 | Peters | 137/625.66 |

Primary Examiner—A. Michael Chambers

[57] ABSTRACT

There is disclosed an apparatus for manually locking a pilot valve in an in-service position, independent of an actuating, or pilot, fluid pressure, so long as such pilot fluid pressure is below a predetermined amount. The device includes a valve manipulating knob attached to the exterior end of the valving element for manually shifting the element from a normally closed position to the in-service position. The knob includes an L-shaped member which conforms to the contour of the knob, and is adapted to pivot toward the valve body and lock the valving element out in the "in-service" position, or the pilot "bypass" position. This pivotal member includes an indicating surface visible from the front when the valving element is locked in the "bypass" position. The knob locking member is to be used in conjunction with a frontfacing pressure gauge having a multi-colored face and a rotating disc thereon to indicate specific pressure ranges by displaying various colors through an aperture in the disc. By glancing at the position of the indicating surface and the color displayed, an operator can readily determine the functional position of a pilot valve controlled motor valve.

9 Claims, 6 Drawing Figures

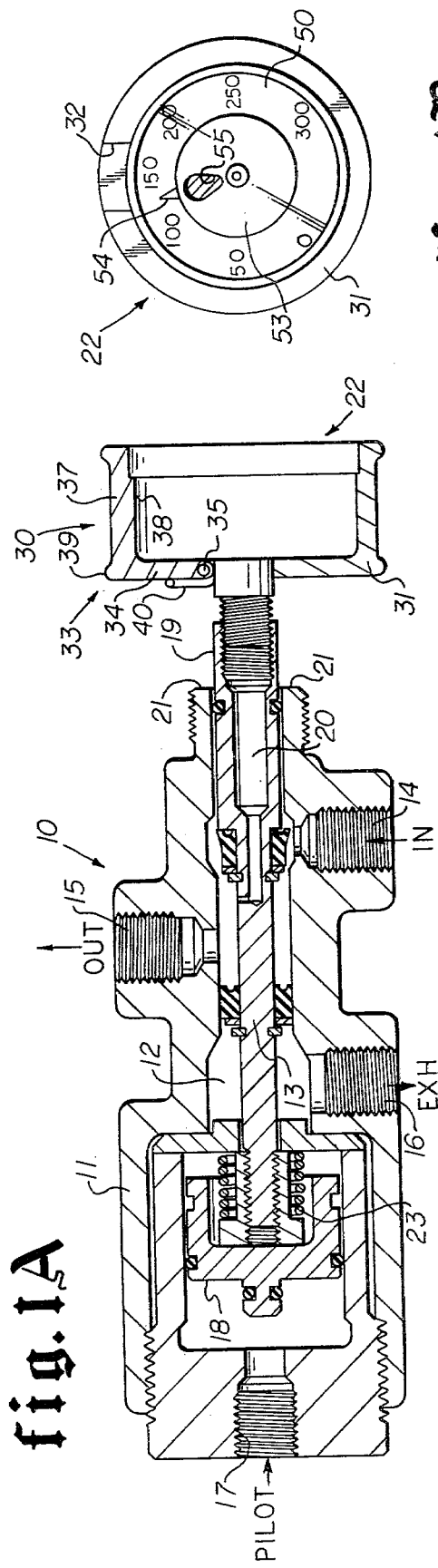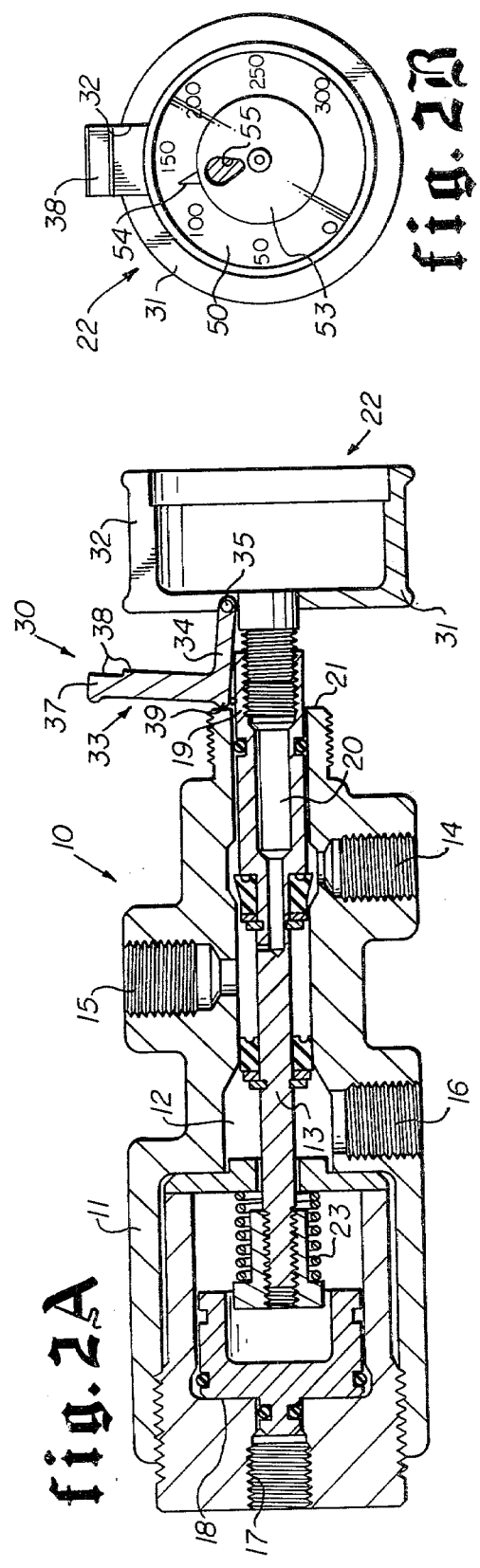

PILOT VALVE WITH INDICATING LOCKOUT KNOB

FIELD OF THE INVENTION

This invention relates to an apparatus for locking a pilot valve in an in-service position and indicating the functional position of a motor valve controlled by the pilot valve.

BACKGROUND OF THE INVENTION

Pilot control valves for use in controlling the application of a control fluid to a controlled valve are old in the art. There are numerous variations of valving element configurations designed to be responsive to pressures, springs or combinations thereof. Also old in the art are variations in valving element pressure areas (i.e., stepped pressure areas) for controlling the pilot valve in a certain manner in response to changes in actuating pressure (pilot pressure). Some pilot valves include external valving element handles for manually shifting the element to control the fluid flow therethrough. Additionally, certain pilot valves of this nature have included a means for locking in a pilot bypass position, independent of pilot pressure, when such pilot pressure is below a predetermined amount.

Pilot valves, which, as in this case, perform a controlling or relaying function, must be monitored frequently and necessarily should be visible from a distance with sufficient resolution to enable an operator to determine, at a glance, whether the pilot valve is in its "in-service" position (operating in response to a pilot pressure), or is locked in its "bypass" position, independent of pilot pressure, so long as such pilot pressure is below the predetermined amount.

It is therefore a primary object of the invention to provide a means whereby a pilot valve may be quickly and easily locked into its "in-service" position and unlocked therefrom.

It is another object of the present invention to provide a means for readily determining from a distance whether the pilot valve is locked into its bypass position.

Yet, another object of the present invention is to provide a means for determining from a distance the control fluid pressure, which in turn, and in conjunction with the pilot bypass locking mechanism, indicates the position of a pilot valve controlled motor valve.

SUMMARY OF THE INVENTION

An apparatus is provided for locking the valving element of a pilot valve in its "in-service" position, allowing the flow of control fluid therethrough, independent of pilot fluid pressure, so long as such pilot fluid pressure is below a predetermined amount. The apparatus is to be used in conjunction with a typical two-position pilot control valve responsive to a pilot pressure. The preferred embodiment includes a valving element knob containing a slot in the upper part thereof. Mating into this slot, and a part thereof, is a generally L-shaped locking member that may be pivoted rearwardly when the valving element is pulled out using its knob. A first leg of the locking member is pivoted rearwardly to engage the front surface of the pilot valve body to retain the valving element out in its "in-service" position.

The locking member includes a second leg that stands vertically when the locking member is locked into position, such second leg having a forward-facing surface for indicating the position of the locking member. Also included is a spring attached to the knob for biasing the locking member forward into its position within the knob slot.

This locking member functions with a forward-facing modified pressure gauge measuring control fluid pressure and having a rotating disc thereon to indicate the position of the pilot valve and a control valve operated by the pilot valve. The rotating disc displays a segment of a color-coded gauge face corresponding to a particular pressure range determined by the function of the controlled valve. By quickly glancing at the gauge face color displayed and to see whether the locking member is up or down, an operator can readily determine the condition of the pilot valve and the control valve.

BRIEF DESCRIPTION OF THE DRAWINGS

FIG. 1A is a vertical sectional view of the pilot valve shown in its "in-service" position, in response to a pilot pressure.

FIG. 1B is the pressure gauge face indicating normal control fluid pressure.

FIG. 2A is a vertical sectional view of the pilot valve shown in its "pilot bypass" position, having the locking member operational in the absence of a pilot pressure.

FIG. 2B is a front view of the gauge face displaying the indicating surface of the locking member and a normal control fluid pressure.

DETAILED DESCRIPTION OF THE INVENTION

Figure 3:
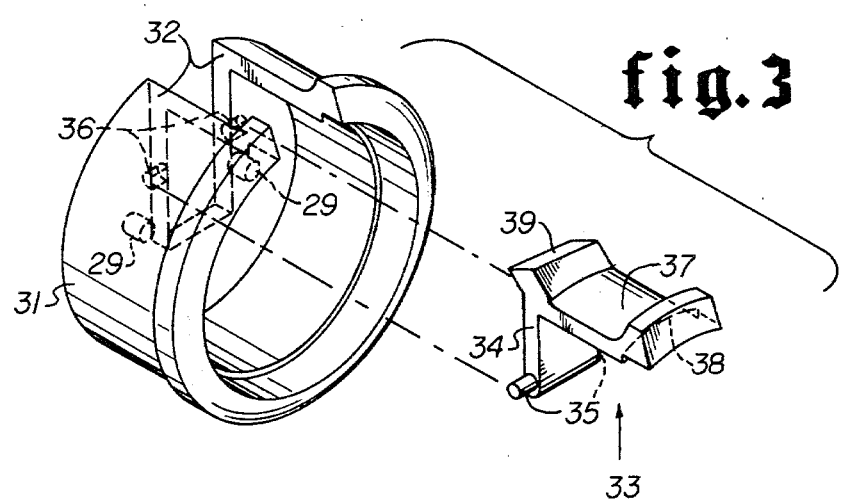
FIG. 3 is a isometric view of the pressure gauge housing (knob) and the L-shaped locking member.

Turning now to the drawings, a typical pilot valve is shown generally illustrated at 10. It includes the body 11 having an internal bore 12. Within this bore 12 is a valving element 13, which serves to control the flow of a control fluid therethrough. The valve 10 is so designed to provide a flow-through communication between an outlet port 15 and an inlet port 14 when the element 13 is in its "in-service" position (FIG. 1A) and to provide a flow-through communication between the outlet port and an exhaust port 16 when the element is shifted to the left to "exhaust" position. In this manner, with the pilot valve 10 "in-service", a control fluid at the inlet port 14 flows to the outlet port 15 and thus to the operating mechanism of a controlled valve, such as a motor valve (not shown). Shifting the element 13 to the "exhaust" position interrupts communication between inlet and outlet ports 14 and 15 and provides communication between the outlet and exhaust port 15 and 16, releasing the control fluid pressure at the controlled valve to atmosphere, and allowing the controlled valve to shift position in response to a self-contained spring or the like.

The action of the pilot valve 10 is controlled by opposing forces of a pilot fluid pressure acting on a piston surface 18 of the valving element 13 and that of an internal first resilient means or spring 23. In the valve shown, pilot pressure at port 17 will retain the valving element 13 in its "in-service" position, as shown in FIG. 1, allowing the control fluid to pass through the valve 10, thereby controlling the operation of a motor valve or other controlled valve. A decrease in this pilot pressure to a predetermined minimum amount permits the element 13 to shift in response to the force of the internal spring 23 to an exhaust position, allowing the motor valve control fluid to exhaust through the pilot valve outlet port 15 and exhaust port 16 and be released to the atmosphere.

The pilot valve includes a pressure indicating gauge 22, connected to an exterior shaft portion 19 of the valving element 13. This shaft has an internal passageway 20 connecting the exterior end thereof with a section of the shaft that is always exposed to the outlet port 15. In this manner, a pressure indicating gauge 22 mounted to the end of the shaft 19 may continuously measure and indicate control fluid pressure at the outlet port 15.

Connected to the pressure gauge 22 and the exterior shaft portion 19 of the valving element 13 is a pilot bypass locking and indicating means generally illustrated at 30. This means 30 comprises a valve element knob 31 for retaining the pressure gauge 22, and which, in conjunction with the gauge, provides a means whereby the valving element 13 may be manually shifted from an exhaust position to an inlet, or "in-service", position, as shown in FIG. 1. This knob 31 is mounted to the gauge 22 by a set of machine screws passing through mounting holes 29 in the rear of the knob.

The pilot bypass locking and indicating means 30 includes a generally L-shaped locking and indicating member 33 for locking the valving element 13 in its inlet or "in-service" position, against the force of the spring 23. This locking member 33 comprises a first leg 34 pivotally connected at one end to the knob 31 so that it may rotate freely from a vertical position generally normal to the axis of the element 13 to a position in which the first leg is parallel and adjacent to the element so as to engage the front surface 21 of the valve body 11 and to preclude the spring 23 from urging the element 13 to its exhaust position. The locking member 33 pivots through approximately 90 degrees by means of a pair of pivot pins 35 rotatably set into mating pivot slots 36 of the element knob 31.

The locking member 33 has a second leg 37 positioned normal to the first leg 34 and connected thereto at the end opposite that of the pivotal connection to the knob 31. This second leg 37 includes an indicating surface 38 which is clearly visible from a point in front of the pressure gauge 22 when the member 33 is in a vertically locked position, as shown in FIG. 2. This surface 38 may be a bright, contrasting color in order to be more easily visible and distinguishable from the pressure gauge and valve body.

The locking member 33 also has a third engaging portion or foot 39 adapted to engage the valve body 11 when the member 33 is in its locked position, and to retain the member 33 in its locked position against the action of the pilot valve spring 23.

In the preferred embodiment, the knob 31 has a cutout or slot 32 in the top thereof for accepting the locking member 33 when the member is in its normally unlocked position, as shown in FIG. 1A. This locking member 33 rotates between a locking position (FIG. 2A) and a normal position (FIG. 1A), in which it rests in the slot 32, conforming to the contour of the knob 31 and forming a part thereof. A second spring 40, connected to the knob 31, acts to urge the locking member 33 into the slot 32.

Figure 4:
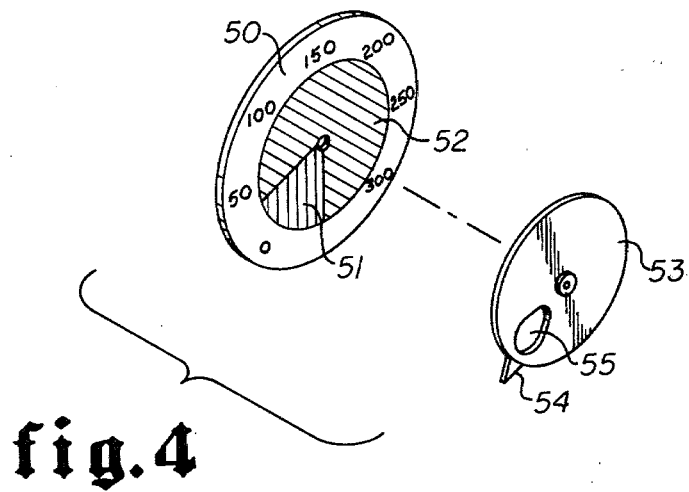
FIG. 4 is an isometric view of the modified pressure gauge face and rotating disc.

As shown in FIG. 4, the preferred embodiment includes a modified gauge face 50 on the pressure gauge 22. This gauge face 50 includes, in addition to standard numbers, a series of adjacent pie-shaped segments 51 and 52 located on the circular portion of the gauge face 50 within an area defined by the location of the numbers. In the particular application of this pilot valve 10, the fluid pressure at the outlet port 15, as measured by the pressure gauge 22, should normally be in a specified range in order to maintain the controlled motor valve in operation. When this control fluid pressure approaches the lower limit of this range, the controlled motor valve closes, creating an abnormal condition. Therefore, control fluid pressure below this range is indicated by the first segment 51 of the gauge face 50, which segment is brightly colored, indicating this abnormal condition. In this particular application, this is the only abnormal condition; therefore the remaining second segment 52 is a continuous second color indicating a normal or safe condition.

As is also shown in FIG. 4, the preferred embodiment includes a flat circular pressure indicating disc 52 replacing the conventional needle positioned on the gauge stem adjacent the gauge face 50. The disc 53 includes a pointer 54 on the periphery thereof which indicates the measured pressure on the gauge face 50. Also included on the disc 53 is an aperture 55 located between the pointer 54 and the center of the disc 53. This aperture 55 is of sufficient size to permit the segment 51 or 52 to be visible from a point in front of the gauge face 50.

In operation, a pilot fluid pressure is supplied to the pilot port 17 of the valve 10 sufficient to maintain valving element 13 in its "in-service" position (FIG. 1A). Under normal operating conditions, a control fluid is supplied to the inlet port 14, and with the element 13 in its "in-service" position, such control fluid passes through the valve 10, out the outlet port 15 and to a motor valve or controlled valve to maintain same operational. Under these conditions, the pressure gauge 22 monitors the control fluid pressure at the outlet port 15, and under normal operating conditions, this pressure is indicated on the pressure gauge 22 (see FIG. 1B). Upon an interruption of the pilot pressure, the spring 23 urges the element 13 toward its exhaust position, interrupting the control fluid path from the inlet port 14 to the outlet port 15. The control fluid is then allowed to exhaust from the motor valve into the outlet port 15 and out the exhaust port 16, causing the motor valve to open or close, depending on its particular application. In this position, the pressure gauge 22, continually monitoring control fluid pressure at outlet port 15, indicates pressure equal to atmosphere, or 0 psi.

This is a common application of a pilot valve operating in response to a pilot pressure to regulate the flow of control fluid to a control valve or motor valve. Frequently, however, it is desirable to retain the valve element 13 of the pilot valve 10 in a "pilot bypass" position, independent of the effects of pilot pressure so long as pilot pressure remains under a predetermined amount. The invention herein is adapted to perform that function, and simultaneously therewith, provide a means whereby an operator may determine, at a glance, whether the pilot valve 10 is locked into its "bypass" position or is in its "in-service" position.

Considering first the "pilot bypass" position: with no pressure at the pilot part 17, or with insufficient pilot pressure at the port to shift the element 13 to its "in-service" position, the operator grasps the knob 31 and pulls it outwardly as if to extract the element 13 from the valve body 11 against the compressive force of the spring 23. This shifting of the element 13 routes the control fluid into the inlet port 14, through the outlet port 15 and into the motor valve or controlled valve. With the exterior shaft portion 19 of the element 13 out from the valve a sufficient amount, the operator then pivots the locking member 33 toward the pilot valve body 11 (counterclockwise as shown in the drawings). While holding the locking member 33 back against the exterior shaft 19 of the element 13, he slowly decreases his outward pulling force on the knob 31, allowing the spring 23 to retract the shaft portion 19 into the valve body 11. The foot 39 of the locking member 33 is permitted to engage the front surface 21 of the valve body 11. In this position, friction between the body front surface 21 and the foot 39 will retain the element 13 in its "pilot bypass" position under the compressive action of the spring 23, as shown in FIG. 2A. With the locking member 33 locked in its "bypass" position, the second leg 37 and its indicating surface thereon 38 stand above the top surface of the knob 31, indicating to an operator positioned in front of the pressure gauge 22, that the element 13 is locked in the bypass position.

To unlock the locking member 33 from its position as shown in FIG. 2A, the operator need only grasp the knob 31 and pull it outwardly against the compressive force of the spring 23. When friction between the front surface 21 of the valve body 11 and the foot 39 of the locking member 33 decreases sufficiently, the second spring 40 urges the member 33 toward its normal position seated in the knob slot 32 concealing the indicating surface 38 from view and indicating that the element 13 is not locked in its "pilot bypass" position.

It is desirable that the pressure gauge 22 be readable from a distance in order that an operator may determine, at a glance, the pressure monitored at the outlet port 15, which determines the position of a controlled motor valve. The invention herein utilizes a multi-colored gauge face 50 having a series of pie-shaped segments thereon encompassing and indicating specific pressure ranges, to be determined by the application of the specific valve. A pressure indicating disc 53 operates exactly as a conventional needle, but with the added feature that allows only that color indicating a condition corresponding to a predetermined range of control fluid pressure to show through the aperture 55. The combination of the series of segments 51 and 52 with the disc 53 having the aperture 55 therein, operates to display a color, indicating a predetermined pressure range, that can be viewed and interpreted at a glance from a distance.

The position of the locking member 33, when used in conjunction with the disc 53 and the multi-colored gauge face 50, tells the operator at a glance the condition of pilot pressure and of the controlled motor valve as follows:

(1) With the locking member 33 down out of view and the second segment 52 visible through the disc aperture 55, the operator knows that, first, the controlled motor valve is operational due to the control fluid pressure as indicated, and secondly, that the pilot fluid pressure is sufficient to retain the valve element 13 in its "in-service" position, as in FIG. 1A;

(2) With the indicating surface 38 of the locking member 33 visible and the second segment 52 visible through the disc aperture 55, as in FIG. 2, the operator knows that, first, the controlled motor valve is operational due to sufficient control fluid pressure, and secondly, that the element 13 is locked in its bypass position, independent of pilot pressure so long as such pilot pressure remains below the predetermined amount. (The operator also knows that, with the element 13 locked in its bypass position, pilot pressure is insufficient to retain the valve in this position, because were the pilot pressure sufficient to maintain the element 13 in its "in-service" position, friction between the valve body front surface 21 and the locking member foot 39 would decrease, allowing the locking member 33 to return to its unlocked position under the influence of the second spring 40);

(3) With locking member 33 in its unlocked position and with the first segment 51 visible through the disc aperture 55, the operator knows that, first, pilot pressure is insufficient to retain the element 13 in its "in-service" position and has allowed the first spring 23 to shift the element to its exhaust position, and secondly, that the controlled motor valve is not functioning in its normal position. Alternatively, the third set of conditions stated herein could indicate a loss of control fluid pressure, which could easily be determined by glancing at other pilot valves supplied by the same control fluid pressure supply.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is comtemplated by and is within the scope of the claims.

As many as possible embodiments may be made of the present invention without departing from the scope thereof, it is to be understood that all matter herein set forth or shown in the accompanying drawings is to be interpreted as illustrative and not in a limiting sense.

The invention having been described, what is claimed is:

1. In a pilot valve for controlling a supply of control fluid to a controlled valve, having a body, an inlet port, an outlet port, an exhaust port, a pilot port, a valving element responsive to a pilot pressure shiftable between an inlet position allowing communication between the inlet and outlet port and an exhaust position allowing communication between the outlet and exhaust ports, said valving element having a shaft portion extending exteriorly of the valve body, and a resilient means for biasing the valving element toward its exhaust position, the improvement conprising a pilot bypass locking and indicating means comprising:

(1) a valve knob connected to the valving element for manually shifting the element from its exhaust to its inlet position;

(2) a generally L-shaped locking and indicating member pivotally connected to said knob having
 a first leg adapted to engage the valve body to lock the valving element in its inlet position, and
 a second leg having an indicating surface thereon for indicating the locked inlet position,
 said locking member being rotatable between a first position in which said first leg extends toward and engages the valve body to lock the valving element in its inlet position against the action of the first resilient means and in which said second leg extends away from the shaft portion to position said indicating surface visibly above said knob, and a second position in which said locking member has said first leg disengaged from the valve body and said second leg extending along and adjacent to said knob to conceal said indicating surface from view, and (3) a second resilient means carried by said knob and one of said leg portions and engaging said locking member for biasing it toward its second position.

2. The device of claim 1, wherein said knob comprises a housing having a pressure indicating gauge therein connected to said valving element shaft portion, said shaft portion having a passageway connecting said gauge and valve outlet port so that said gauge continuously measures and indicates pressure at the outlet port, said gauge having a dial face of different colored pie-shaped areas indicating and encompassing specific pressure ranges and having a flat, circular pressure indicating disc positioned adjacent said dial face and rotating relative thereto, said indicating disc having a pointer on the periphery thereof and an aperture therein adjacent said pointer to enable visual display of said multi-colored dial face and indicate a pressure exposed to said gauge.

3. The device of claim 2, wherein said gauge housing includes a slot for receiving said locking member when said member is in its second position.

4. The device of claim 1, wherein said locking member first leg includes a third engaging portion extending axially therefrom and normal to said member second leg, said third portion being adapted to engage the valve body to lock the valving element in its inlet position.

5. The device of claim 1, wherein said valve knob includes a slot for receiving said locking member when said member is in its second position.

6. The device of claim 1, wherein said valve knob comprises a pressure indicating gauge connected to said valving element shaft portion, said shaft portion having a passageway connecting said gauge and valve outlet port so that said gauge continuously measures and indicates pressure at the outlet port.

7. The device of claim 6, wherein said gauge includes a slot located in its integral housing for receiving said locking member when said member is in its second position.

8. In a pilot valve for controlling a supply of control fluid to a controlled valve, having a body, an inlet port, an outlet port, an exhaust port, a pilot port, a valving element responsive to a pilot pressure shiftable between an inlet position allowing communication between the inlet and outlet ports and an exhaust position allowing communication between the outlet and exhaust ports, said valving element having a shaft portion extending exteriorly of the valve body, a first resilient means for biasing the valving element toward its exhaust position, and a pressure indicating gauge connected to said valving element shaft portion, said shaft portion having a passageway connecting said gauge and valve outlet port so that said gauge continuously measures and indicates the pressure at the outlet port, the improvement comprising a pilot bypass locking and indicating means comprising:

(1) a gauge housing having a slot therein, connected to the valving element for retaining the gauge and allowing manual shifting of the element from its exhaust to its inlet position, (2) a generally L-shaped locking and indicating member comprising:

(a) a first leg pivotally connected at one end to said gauge housing and dimensioned to conform to the contour of said housing, (b) a second leg having an indicating surface thereon for indicating the locked inlet position, and (c) a third engaging portion extending axially from said first leg and normal to said second leg, said third portion being adapted to engage the valve body to lock the valving element in its inlet position, said locking member being rotatable between a first position in which said first leg and third portion are parallel and adjacent the valving element shaft portion and extend toward and engage the valve body to lock the valving element in its inlet position against the action of the first resilient means and in which said second leg extends away from the shaft portion to position said indicating surface visibly above said gauge housing, and a second position in which said locking member has said third portion disengaged from the valve body and said locking member rests in said slot in said gauge housing, the contours of said member and housing conforming with each other so as to appear to be one in the same and concealing said indicating surface from view; and (3) a second resilient means carried by said gauge housing and engaging said locking member for biasing it toward its second position.

9. The device of claim 8, wherein said gauge includes a dial face of different colored pie-shaped areas indicating and encompassing specific pressure ranges and having a flat, circular pressure indicating disc positioned adjacent said dial face and rotating relative thereto, said indicating disc having a pointer on the periphery thereof and an aperture therein adjacent said pointer to enable visual display of said multi-colored dial face and indicate a pressure exposed to said gauge.

* * * * *